United States Patent
Merchant et al.

(10) Patent No.: US 6,599,550 B2
(45) Date of Patent: Jul. 29, 2003

(54) LOW TEMPERATURE COOKING CEREAL-BASED PRODUCTS

(75) Inventors: Zohar Mohamed Merchant, Wilmette, IL (US); Maluwa Ursula Behringer, Evanston, IL (US); Laura Gail Hill, Prospect Heights, IL (US); Andrew Edward McPherson, Mt. Prospect, IL (US); Uraiwan Tangprasertchai, Hoffman Estates, IL (US); Robert August Vogt, Princeton Junction, NJ (US); Dalip Kumar Nayyar, Grayslake, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 56 days.

(21) Appl. No.: 09/777,029

(22) Filed: Feb. 5, 2001

(65) Prior Publication Data

US 2001/0024673 A1 Sep. 27, 2001

Related U.S. Application Data

(60) Provisional application No. 60/180,335, filed on Feb. 4, 2000.

(51) Int. Cl.$^7$ .............................................. A21D 10/00
(52) U.S. Cl. .......................... 426/549; 426/94; 426/653
(58) Field of Search .............................. 426/94, 96, 99, 426/653, 549, 553

(56) References Cited

U.S. PATENT DOCUMENTS

| | | | | |
|---|---|---|---|---|
| 3,867,556 A | * | 2/1975 | Darragh et al. | 426/653 |
| 5,098,725 A | * | 3/1992 | Rotman et al. | 426/98 |
| 5,565,227 A | * | 10/1996 | Mason et al. | 426/96 |
| 5,576,036 A | * | 11/1996 | Pesheck et al. | 426/94 |
| 6,245,366 B1 | * | 6/2001 | Popplewell et al. | 426/96 |

* cited by examiner

Primary Examiner—Lien Tran
(74) Attorney, Agent, or Firm—Ftich, Even, Tabin & Flannery

(57) ABSTRACT

Improved cereal-based food products suitable for cooking in a low temperature (i.e., generally about 120 to 212° F.) and high moisture (i.e., steam) environment are provided. The improved cereal-based food products, when cooked in a low temperature and high moisture environment, provide aroma and surface appearance characteristics similar to that of oven-baked goods. An aroma-enhancement component is obtained by micro encapsulating flavorants and/or aroma components in a hard fat. The aroma-enhancement component is incorporated into the dough or cereal-based substrate. The flavorants and/or aroma components are released during the low temperature cooking process. The surface appearance is obtain by coating the dough or cereal-based substrate with a crust-enhancement component containing potato flakes, hydrophobic starch, crust flavorants, colorants, and anti-caking agents. The crust-enhancement component, when cooked in a low temperature and high moisture environment, provide a crust which is comparable to that of oven-baked goods.

22 Claims, No Drawings

LOW TEMPERATURE COOKING CEREAL-BASED PRODUCTS

RELATED APPLICATION

This application is based on, and claims benefit of, U.S. Provisional Application Serial No. 60/180,335, filed on Feb. 4, 2000.

FIELD OF THE INVENTION

This invention relates to cereal-based food products suitable for cooking in a low temperature (e.g., generally about 120 to 212° F.) and high moisture (e.g., steam) environment. In particular, the invention relates to cereal-based food products which, when cooked in a low temperature and high moisture environment, provide aroma and surface appearance characteristics similar to that of oven-baked goods. The aroma characteristics are obtained by incorporating microencapsulated flavorants and/or aroma components into the dough or cereal-based substrate; the microencapsulated flavorants and/or aroma components are released during the low temperature cooking process. The surface appearance is obtain by coating the dough or cereal-based substrate with a dry mixture containing potato flakes, hydrophobic starch, crust flavorants, colorants, and anti-caking agents which, when cooked in a low temperature and high moisture environment, provide a crust which is comparable to that of oven-baked goods. The cereal-based food products of this invention can be formulated as dry mix type products for use in the home kitchen or as ready-to-cook and convenient side dishes, main dishes, or complete meals.

BACKGROUND OF THE INVENTION

Typically, cereal-based products (e.g., rolls, bread, dumplings, and the like) cooked in a low temperature (i.e., about 120 to about 212° F.) and high moisture (i.e., ambient to steam) environment lack the desired flavor, texture, and appearance characteristics generally associated with freshly baked products prepared in a conventional oven. Moreover, such cereal-based products generally have a pale appearance, a moist, soft, and/or chewy texture, and a non-caramelized flavor. Although such cereal-based products offer significance convenience to the consumer and, in many cases, good flavor characteristics, they generally lack the rich-crust and pleasing aroma associated with baking bread-type products.

Warm, freshly baked bread just out of the oven has a look, taste, and aroma appeal that is unique. Ideally, the bread has a warm, soft interior crumb texture and a crisp "golden brown" crust characteristic of french bread. Unfortunately, this unique combination of bread characteristics is difficult and time consuming to achieve for the average consumer.

A great deal of effort, however, has been directed toward providing cereal-based bread products which offer varying levels of convenience while reproducing warm fresh bread to varying degrees. Frozen bread dough items are well known which upon thawing can be shaped into loaves, proofed, and baked in a conventional oven. Even greater convenience is provided by products that are referred to as "brown-and-serve" products. These products generally are partially baked items which are finished baked by the consumer in a conventional oven. While convenient, the preparation of brown-and-serve products still requires a lengthy preheating of the oven and then a finish baking step of about 10–20 minutes. More recently, bread machines have become popular for producing bread product in the home. Although such bread machines can provide excellent bread products, they still require considerable effort and often involve significant periods of time.

Attempts have also been made to provide aroma-enhancement in steamed or low-temperature processed cereal-based products by simply adding high levels of flavorants to the components. Unfortunately, the increased levels of flavorants necessary to achieve the desired aroma characteristics often lead to undesired and objectionable taste characteristics.

Generally, a high temperature (i.e. greater than about 300° F.) and a dry environment are required to obtain the desired golden brown and crispy crust in oven-baked bread products. Attempts to provide similar appearance and texture using low temperature cooking conditions have generally not been as successful as desired.

There still remains a need for cereal-based products which can easily be prepared in the home kitchen and which provide the taste, appearance, and aroma of freshly baked bread products. There also remains a need for cereal-based products which can easily be prepared in the home kitchen under low temperature and high moisture conditions and which provide the taste, appearance, and aroma of freshly baked bread products. There also remains a need for cereal-based products in the form of a dry mix which can easily be prepared in the home kitchen under low temperature and high moisture cooking conditions and which provide the taste, appearance, and aroma of freshly baked bread products. As one of ordinary skill in the art will realize upon considering this specification, the cereal-based products of the present invention provide and meet these objectives and allow the consumer to produce cooked cereal-based products under low temperature and high moisture cooking conditions which have aroma, appearance, texture, and flavor properties comparable to freshly baked goods.

SUMMARY OF THE INVENTION

This invention relates to cereal-based food products suitable for cooking in a low temperature and high moisture environment. For purposes of this invention, "low temperature" is generally defined as a temperature of about 120 to about 212° F. For purposes of this invention, "high moisture" conditions are generally defined as ambient humidity conditions up to conditions associated with steamers and are intended to be distinguished from conditions associated the dry heat normally associated or obtained in conventional baking processes. Thus, "high moisture" conditions are generally humidity conditions above ambient humidity. Such low temperature and high moisture environments can be obtained using, for example, a steamer, stovetop skillet, fry pan, camp stove, or microwave oven. In particular, the invention relates to cereal-based food products which, when cooked in a low temperature and high moisture environment, provide aroma and surface appearance characteristics similar to that of oven-baked goods. The aroma characteristics are obtained by incorporating microencapsulated flavorants and/or aroma components within the dough or cereal-based substrate; the microencapsulated flavorants and/or aroma components are released during the low temperature cooking process. The surface appearance is obtain by coating the dough or cereal-based substrate with a dry mixture (i.e., the crust-enhancing component) which, when cooked in a low temperature and high moisture environment, provide a crust which is comparable to that of oven-baked goods.

The cereal-based food products can be formulated as dry mix type products for use in the home kitchen. Such dry mixes can be combined with appropriate liquids (e.g., water or milk) to form a dough with microencapsulated aroma ingredients distributed throughout the dough. The dough could then be coated or covered with the crust-enhancing component. The resulting product can be cooked under low temperature and high humidity conditions to provide a cereal-based having aroma characteristics and crust characteristics comparable to freshly baked bread.

These cereal-based food products can also be used in ready-to-cook and convenient side dishes, main dishes, or complete meals. These cereal-based food products could also be provided as conventional "brown-and-serve" type products, except, of course, oven baking would not be required. Such ready-to-cook products could have the dough fully prepared (i.e., the aroma enhancing incorporated into the cereal-based product and crust-enhancing components covering the cereal-based product) or partially prepared (i.e., the aroma enhancing component incorporated into the cereal-based product and crust-enhancing component applied at the time of cooking). In either case, the resulting product can be cooked under low temperature and high humidity conditions to provide a cereal-based having aroma characteristics and crust characteristics comparable to freshly baked bread.

Using the aroma-enhancing systems or compositions of this invention, improved aroma during preparation as well as a good taste during consumption can be obtained. Thus, cereal-based products such as rolls, biscuits, dumplings, pastries, donuts, muffins, pancakes, loaf bread, and similar quick-bread type products can be cooked under low temperature/high moisture conditions to provide a cooked product similar in aroma/flavor characteristics to a traditional oven baked product. Importantly, the aroma released during cooking provides a desirable "freshly-baked" aroma to enhance the overall desirability of the product. Using the dry crust-enhancing systems or compositions of this invention, cereal-based products such as rolls, biscuits, or dumplings can be cooked under low temperature/high moisture conditions to provide a cooked product having a crust similar in appearance, texture, and flavor characteristics to a traditional oven baked product.

The aroma-enhancing and crust-enhancing components or systems can be used separately (i.e., products having only one of the systems incorporated therein) or in combination (i.e., products having both systems incorporated therein). The systems can be used in combination because both systems are designed to be cooked or activated using a low temperature, high humidity environment. Generally products incorporating both systems are preferred.

The aroma-enhancement system is prepared by mixing the desired flavorants/aroma enhancers into a melted hard fat which is then chill sprayed under pressure into a system below the melting point of the hard fat to quickly solidify, thereby forming a microencapsulated flavorant/aroma enhancer in the form of a free flowing powder. If desired, the flavorants/aroma enhancers and melted hard fat mixture can be sprayed into an ultra-low temperature system (e.g., liquid nitrogen) to achieve almost instantaneous solidification. The resulting free flowing powder can be incorporated into a dry mix suitable for forming a bread dough upon addition of water or milk by the consumer or can be incorporated into bread dough for packaging as a ready-to-cook product. Since the flavorants/aroma enhancers are microencapsulated, they remains stable in the prepared dough. During cooking at low temperatures, the hard fat will release the flavorants/aroma enhancers. Thus, products prepared a low temperature (i.e., about 120 to about 212° F.) and high moisture environment can provide significantly improved bread/biscuit aroma (i.e., the "freshly-baked" smell) with good taste characteristics.

The dry crust-enhancing system or component of the present mixture is formulated as a dry topping to be applied to the exterior of a cereal-based product prior to cooking the cereal-based product in a low temperature (i.e., about 120 to about 212° F.) and high moisture environment. The dry topping comprises potato flakes, hydrophobic starch, flavorants, colorants, and an anti-caking agent. When topically applied to the cereal-based product and cooked under low temperature (i.e., about 120 to about 212° F.) and high moisture conditions, cereal-based products having a surface or crust with appearance, texture, and taste of conventional oven-baked goods can be obtained. The dry crust-enhancing component can be applied during the manufacturing process or by the consumer when the product is cooked. For use in the home kitchen, the dry crust-enhancing component can be applied using any convenient method. Such methods include, for example, application of the dry crust-enhancing component using a shaker or a bag containing the dry crust-enhancing component in which the dough product is placed and shaken. All or only a portion of external surfaces of the dough product may be coated with the dry crust-enhancing component.

One object of the present invention is to provide a cereal-based product which can be cooked under low temperature and high moisture conditions to provide a cooked product having the aroma, texture, and appearance of freshly-baked goods, said product comprising a cereal-based dough containing an aroma-enhancement component distributed throughout the cereal-based dough and a crust-enhancement component covering at least some of the exterior surfaces of the cereal-based dough; wherein the aroma-enhancement component is an essentially dry powder containing flavorants or aroma components microencapsulated in a hard fat having a melting point of about 100 to about 180° F.; wherein the crust-enhancement component comprises potato flakes, hydrophobic starch, crust flavorants, colorants, and an anti-caking agent; wherein the cereal-based product, when cooked under low temperature and high moisture conditions, provides the cooked product having the aroma, texture, and appearance of freshly-baked goods.

Another object of the present invention is to provide an aroma-enhancement component suitable for use in cereal-based products which are to be cooked under low temperature and high moisture conditions, said aroma-enhancement component comprising flavorants and aroma components microencapsulated in a hard fat having a melting point of about 100 to about 180° F., wherein the aroma-enhancement component is a dry, free flowing powder have an average particle size of less than about 1000 microns, and wherein the aroma-enhancement component, when incorporated into cereal-based products, will release the flavorants and aroma components when the cereal-based products are cooked under low temperature and high moisture conditions to provide an aroma comparable to freshly baked goods.

Another object of the present invention is to provide a crust-enhancement component suitable for use in cereal-based products which are to be cooked under low temperature and high moisture conditions, said crust-enhancement system comprising a dry mixture containing about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent, wherein the crust-enhancement component when topically applied to cereal-based products and when cooked under low temperature and high moisture conditions provides appearance, texture, and flavor comparable to freshly baked goods.

Another object of the present invention is to provide a method for preparing a cereal-based product which can be cooked under low temperature and high moisture conditions to provide a cooked product having the aroma and appearance of freshly-baked goods, said method comprising (1) providing a cereal-based dough;
(2) blending an aroma-enhancement component throughout the cereal-based dough;
(3) shaping the cereal-based dough containing the aroma-enhancement component into a desired shape; and
(4) applying a crust-enhancement component to at least a portion of the exterior surface of the shaped cereal-based dough to provide the cereal-based product;

wherein the aroma-enhancement component is an essentially dry powder containing flavorants or aroma components microencapsulated in a hard fat having a melting point of about 100 to about 180° F.; wherein the crust-enhancement component comprises about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent; and wherein the cereal-based product, when cooked under low temperature and high moisture conditions, provides the cooked product having the aroma and appearance of freshly-baked goods.

DETAILED DESCRIPTION OF THE INVENTION

The present invention is directed to cereal-based products which can be cooked under low temperature and high moisture conditions. Generally these cereal-based products are designed to be cooked at temperatures of about 120 to about 212° F., and preferably at about 120 to 200° F., under ambient humidity to steam conditions. These cereal-based products are ideally suited for cooking using steamer, stovetop skillet, fry pan, camp stove, or microwave oven environments. In particular, the invention relates to cereal-based food products which, when cooked in a low temperature and high moisture environment, provide aroma and surface appearance characteristics similar to that of oven-baked goods. The aroma characteristics are obtained by incorporating microencapsulated flavorants and/or aroma components into the dough or cereal-based substrate; the microencapsulated flavorants and/or aroma components are released during the low temperature cooking process. The surface appearance is obtain by coating the dough or cereal-based substrate with a dry mixture which, when cooked in a low temperature and high moisture environment, provide a crust which is comparable to that of oven-baked goods. The cereal-based food products of this invention can be formulated as dry mix type products for use in the home kitchen or as ready-to-cook and convenient side dishes, main dishes, or complete meals.

The aroma-enhancing and crust-enhancing features of the present invention can be used together or separately in a wide variety of cereal-based products. These aroma-enhancing and crust-enhancing features can be incorporated into dry mixtures designed to be prepared in the home kitchen by adding the appropriate liquid (e.g., water or milk) or as ready-to-cook side dishes, main dishes, or completer dinners. Such dry mixtures products include, for examples, mixes for the preparation of rolls, biscuits, dumplings, and similar products. Such ready-to-cook products include, for example, rolls, biscuits, dumplings, casseroles or main dishes with a bread/biscuit covering, other bread-covered dishes, and the like. The cereal-based foods products of this invention can be formulated as complete dishes or as kits wherein the consumer may supply additional components. For example, such a kit may contain a sauce along with ingredients for making a biscuit covering; the consumer could then add browned meat, chicken, vegetables (fresh or supplied with the kit), or other ingredients; the sauce and added ingredients would then be covered with the bread/biscuit mixture using the aroma-enhancing and/or crust-enhancing components or compositions. Preferably, the crust-enhancing component would be applied to the top of the biscuit dough covering after assembly of the dish but before the cooking step. The resulting biscuit-covered stew or main dish could be cooked under low temperature and high moisture conditions using, for example, a covered skillet or frying pan on the rangetop (e.g., simmering for about 5 to about 15 minutes). If desired the composition and products of this invention could also be packaged as separate servings of bread or rolls. For such single serving packaging, the aroma-enhancing components would preferably be included within the bread dough; the crust-enhancing component could be applied during manufacturing (especially for frozen product lines) or included in a separate container or pouch for application by the consumer just before cooking.

The aroma-enhancing system includes selected flavorants and/or aroma enhancers microencapsulated in a hard fat matrix. Generally the hard fat used as the matrix has a melting point of about 100 to about 180° F. and preferably about 140 to about 150° F. so that the selected flavorants and/or aroma enhancers are released during cooking at low temperatures (i.e., about 120 to about 212° F.). Suitable hard fats include, for example, cottonseed, partially hydrogenated cottonseed, soybean, partially hydrogenated soybean, hydrogenated soybean, coconut palm kernel, and the like. Generally the amount of flavorants and/or aroma-enhancers microencapsulated in the hard fat matrix is about 10 to about 70 percent, and preferably in the range of about 30 to about 40 percent. More preferably, the aroma-enhancing component contains about 30 percent flavorants and aroma enhancers and about 70 percent hard fat.

Generally a wide variety of flavorants or aroma enhancers can be included in the aroma-enhancing system depending on the both the variety and strength of the desired aroma and/or flavor characteristics. Indeed, combinations of such flavorants and/or aroma-enhancers can be used to obtain custom flavor/aroma profiles. The flavorants and/or aroma enhancers can be in solid or liquid forms. Flavor and/or aroma enhancer oils are especially preferred since, once released, they should have a more pronounce aroma profile. Generally, buttery and/or buttermilk flavorants are preferred. Suitable buttery and/or buttermilk flavorants include, for example, diacetyl, acetoin, gamma-decalactone, and the like. Of course, other flavorants can be used and, in some cases, may be preferred depending on the specific product. For example, Mexican type flavorants may be used in a ready-to-cook Mexican dish. Or oriental type flavorants may better complement a ready-to-cook Chinese dish. One especially preferred aroma-enhancing systems comprises about 30 percent of a concentrated artificial liquid biscuit flavor (containing diacetyl, acetoin, and gamma-decalactone) in a cottonseed oil (AC Humko Corp., Memphis, Tenn.). Preferably, such an aroma-enhancement component is included in the finished cereal-based product at a level of about 0.1 to about 0.5 percent.

The microencapsulated aroma-enhancement component is prepared by mixing the desired flavorants and/or aroma-enhancers in the melted hard fat and then using appropriate spray chilling techniques and procedures. Generally it is preferred that the flavorant/aroma-enhancer/melted hard fat mixture is sprayed under high pressure into a chilled tower or other chilled system so that the particles solidify quickly, preferably essentially immediately, to form a free flowing powder. For example, the flavorant/aroma-enhancer/melted hard fat mixture can be sprayed at a pressure of about 100 to about 1000 psi into a chilled tower or container at a temperature of less than the melting point of the hard fat and, more preferably, at a pressure of about 100 to about 800 psi and a temperature of less than about 0° F. To insure extremely rapid cooling, the flavorant/aroma-enhancers/ melted hard fat mixture could be sprayed directly into a system cooled with, for example, liquid nitrogen. Preferably the microencapsulated aroma-enhancement component has an average particle size less than about 1000 microns, more preferably about 250 to about 1000 microns, and more preferably about 300 to about 600 microns. General methods suitable for microencapsulation are discussed in, for example, Jackson et al., "Microencapsulation and the Food Industry," *Lebensm. Wiss. U. Technol.*, 24, 289–97 (1991); Balassa et al., "Microencapsulation and the Food Industry," *CRC Critical Reviews in Food Technology*, 245–65 (July 1971); and Tuley, "Breaking Free: Update on Controlled Flavour Release," *International Food Ingredients*, No. 3 (1996), each of which is incorporated by reference herein.

The crust-enhancing component is prepared as a dry mixture of potato flakes, hydrophobic starch, crust flavorants, colorants, and an anti-caking agent. Preferably, the crust-enhancing component comprises about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent. More preferably, the crust-enhancing component comprises about 25 to about 35 percent potato flakes, about 20 to about 25 percent hydrophobic starch, about 25 to about 35 percent crust flavorants, about 10 to about 20 percent colorants, and about 0.2 to about 1 percent anti-caking agent. The crust-enhancing is applied to at least a portion of the external surfaces of the cereal-based product (i.e., roll, biscuit, dumpling, and the like) and then cooked under low temperature and high moisture conditions to provide the cooked product having the appearance (i.e., golden brown) and texture (i.e., flaky) comparable to freshly-baked goods.

Although not wishing to be limited by theory, it is believed that the hydrophobic and film forming properties of the hydrophobic starch retard water uptake from the high moisture environment (i.e., steam produced during cooking) and forms a protective interface layer that keeps the surface of the cereal-based product dry during cooking. At the same time, the natural hydration properties of the potato flakes facilitates rapid absorption of water from the surface of the cereal-based product during cooking. The individual flakes appear to adhere to the surface to the cereal-based product to create, upon cooking, a flaky crust-like texture as an integral part of the cooked cereal-based product. The hydrophobic and film formation properties of the starch in combination with the rapid hydration of the potato flakes provides an unexpectedly dry, firm, flaky surface appearance and texture under low temperature and high moisture cooking conditions. Thus, the seemingly opposite properties of the potato flakes (i.e., its rapid water absorption) and the starch (i.e., its hydrophobic nature) combine to provide a unique cereal-based product which provides a crust having the appearance and texture of a freshly-baked bread product when cooked under low temperature and high moisture conditions.

Suitable potato flakes for use in this invention can be obtained, for example, from Kerry Ingredients, Basic American Foods Company, Idaho Pacific Corporation, NonPareil Corporation, and the like. Preferably, NonPareil Corporation potato flakes are employed. The potato flakes can be agglomerated.

Suitable hydrophobic starches for use in this invention can be obtained, for example, from National Starch and Chemical (e.g., National N-Creamer 46, National 1333, National Dry-Flo) as well as other suppliers. Preferably, a hydrophobic starch sold under the Dry-Flo tradename (i.e., hydrophobically modified corn starch) from National Starch and Chemical is employed.

The selection of crust flavorants and/or colorants in the crust-enhancing component will, of course, depend on the flavor and color desired in the microwaved cereal-based product. The crust flavorants may be the same as or different from the flavorants used in the microencapsulated aroma-enhancement component or the crust flavorants may be selected to complement the flavorants used in the microencapsulated aroma-enhancement component. Generally, buttery and/or buttermilk crust flavorants are preferred. Suitable buttery and/or buttermilk crust flavorants include, for example, diacetyl, acetoin, gamma-decalactone, and the like. Of course, other crust flavorants can be used and, in some cases, may be preferred depending on the specific product. For example, Mexican type crust flavorants may be used in a ready-to-cook Mexican dish. Or oriental type crust flavorants may better complement a ready-to-cook Chinese dish.

Likewise, a wide selection of colorants may be used depending on the specific product desired. Generally, colorants that allow the golden brown "freshly-baked" appearance are preferred. Examples of such colorants (i.e., browning liquid products) include those described in U.S. Pat. Nos. 4,994,297 (Feb. 19, 1991), 5,039,537 (Aug. 13, 1991), 5,292,541 (Mar. 8, 1994), 5,397,582 (Mar. 14, 1995), and 5,756,140 (May 26, 1998), all of which are incorporated by reference. These colorants, which are generally prepared by pyrolyzing sugars and starches, provide a brown, smoked color without imparting an undesirable smoke flavor to the food product. An especially preferred colorant is Mailose Dry™ from Red Arrow Products (Manitowoc, Wis.). Of course, other edible food grade colorants (e.g., caramel or non-traditional colorants that might appeal to children) can be used.

The crust-enhancing component is preferably a dry, freely-flowing powder. Since some of the components are at least mildly hygroscopic, an anti-caking agent is preferably used. Suitable anti-caking agents include, for example, silicon dioxide, sugar, salt, other crystalline ingredients. Generally, hydrated silicon dioxide is the preferred anti-caking agent. The anti-caking agent may be added as a separate ingredient or it may be included with other ingredients. For example, the preferred colorant (i.e., Mailose Dry™) contains hydrated silicon dioxide as an anti-caking agent. An especially preferred crust-enhancing component contains about 14 to about 15 percent Mailose Dry™, about 30 to about 32 percent of agglomerated potato flakes, about 30 to about 32 percent Natural Butter Flavor 32X, about 22 to 24 percent Dry-Flo modified food starch, and about 0.4 to about 0.6 percent silicon dioxide.

In addition to the anti-caking agent, it is also preferred that the crust-enhancing component is packaged in an air tight package or container to help insure it remains free flowing. If the crust-enhancing component is to be applied to the cereal-based product by the consumer at the time of preparation, the crust-enhancing component could be stored in an air tight package or shaker. If the crust-enhancing component is to be applied to the cereal-based product during manufacturing, the cereal-based product along with its crust-enhancing component layer could be stored in an air tight package; generally such application techniques are suitable for frozen products. Generally, it is preferred that the crust-enhancing component is applied by the consumer at the time of preparation. Generally, the batter is sufficiently moist and sticky such that the crust-enhancing component adhere to the external surfaces.

The cereal-based product dough or dough mixture, absent the microencapsulated aroma-enhancement component and the crust-enhancement component, is prepared using convention techniques and ingredients. For dry mix products (i.e., wherein the consumer adds water or milk to the dough ingredients), the microencapsulated aroma-enhancement component can be included in the dry dough mix which could be added to the dry dough mix during preparation of the dough or could be blended into the prepared dough. In such cases, the microencapsulated aroma-enhancement component is preferably included in the dry dough mix. For ready-to-cook products (i.e., the already-formed and shaped cereal-based dough product is included in the product), the microencapsulated aroma-enhancement component is included in, and preferably distributed homogeneously throughout, the cereal-based dough product.

For both dry mix products and ready-to-cook products, the crust-enhancement component is preferably contained in a separate container so that it can be applied to at least a portion of the external surfaces of the shaped dough product by the consumer just before cooking. For ready-to-cook frozen products, of course, the crust-enhancement component could be applied before packaging if desired.

Generally, the crust-enhancement component consists of about 0.5 to about 2.5 percent, and preferably about 1.0 to about 2.0 percent, of the total cereal-based product. Likewise, the microencapsulated aroma-enhancement component consists of about 0.1 to about 0.5 percent, and preferably about 0.15 to about 0.25 percent, of the total cereal-based product.

The following examples are intended to illustrate the invention and not to limited it. Unless otherwise stated, all percentages are by weight.

EXAMPLE 1

Preparation of Aroma-Enhancing Component.

A measured amount of a hard fat (e.g., hydrogenated cottonseed or partially hydrogenated soybean oil) is melted and maintained in the liquid state. Biscuit/bread flavor (containing about 98.6 percent artificial flavor ingredients (diacetyl, acetoin, and gamma-decalactone), about 0.8 percent coconut oil, about 0.4 percent ethanol, and about 0.2 percent triglycerides; obtained from Atlantic Gelatin of Woubourn, Mass.) at a level of about 30 percent is added to the melted hard fat. The melted fat/flavor mixture is placed in a stainless steel chamber (maintained at temperature above the melting point of the fat) and immediately sprayed under 700–800 psi into liquid nitrogen to harden the melted fat/flavor droplets. Th fine free flowing powder is stored in a sealed container at 40° F. If longer term storage (e.g., greater than about 24 hours) is desired, storage at a lower temperature is preferred.

EXAMPLE 2

Preparation of Aroma-Enhancing Component

A hydrogenated cottonseed oil with a melting point of about 140° to about 150° F. (Dritex C4 IV Flakes, AC Humko Corp., Memphis, Tenn.) is melted at 150° F. in a stainless steel heated vessel. Biscuit flavor as described in Example 1 is added to the melted hard fat to provide a liquid mixture that is 30%+/−0.5% flavor. The liquid mixture is stirred and pumped at about 33 cubic centimeter/minute and 35–60 psi through a heated gear pump and ¼ inch heat traced line to a 0.009 inch spray orifice (Spray System, Inc.). The stream of liquid is directed at about 45 degrees to the horizontal into a container at ambient temperatures; the resulting solid beads provide a free flowing encapsulated biscuit flavor/aroma component.

EXAMPLE 3

Preparation of Crust-Enhancing Component

The dry biscuit topping is prepared by dry blending potato flakes (about 30%), modified corn starch (about 24%), butter flavor (about 30%), maillose (about 15%) and silicon dioxide (about 0.5%) to form a free flowing mixture.

EXAMPLE 4

The encapsulated biscuit flavor/aroma from Examples 1 and 2 is incorporated into bread/biscuit mix and tested for aroma release during preparation (i.e., low temperature cooking). Milk (⅓ cup) is added to a dry biscuit mix containing the encapsulated aroma components. The mixture is stirred and dropped by spoonfuls in a skillet to produce a dumpling type product. A dry biscuit topping as described in Example 3 is applied topically to the exposed surface of the dough. The skillet is covered and the product is cooked on the stovetop on medium low heat (i.e., simmer) for about 12 minutes.

Organoleptic evaluation by a panel indicated that encapsulated aroma was preferred for aroma release upon preparation. The encapsulated aroma also had an acceptable taste as compared to a control (i.e., spray dried flavor systems). Generally, the product prepared with the aroma-enhanced component and crust-enhancement component had high acceptability with regard to organoleptic properties.

EXAMPLE 5

Particle size and gas chromatographic analysis was performed on the encapsulated flavor components made above. The particle size data showed 90% to be under 600 microns and 10% to be under 300 microns. The gas chromatographic data demonstrated a significantly different that the flavor release profile for the aroma-enhanced components of Examples 1 and 2 was significantly different from similar unencapsulated flavor systems.

We claim:

1. A cereal-based product which can be cooked under low temperature and high moisture conditions to provide a cooked product having the aroma, texture, and appearance of freshly-baked goods, said product comprising a cereal-based dough containing an aroma-enhancement component distributed throughout the cereal-based dough and a crust-enhancement component covering at least some of the exterior surfaces of the cereal-based dough; wherein the aroma-enhancement component is an essentially dry powder containing flavorants or aroma components microencapsulated in a hard fat having a melting point of about 100 to about 180° F.; wherein the crust-enhancement component comprises potato flakes, hydrophobic starch, crust flavorants, colorants, and an anti-caking agent; wherein the cereal-based product, when cooked under low temperature and high moisture conditions, provides the cooked product having the aroma, texture, and appearance of freshly-baked goods.

2. The cereal-based product of claim 1, wherein the aroma-enhancement component is a dry, free flowing powder have an average particle size of less than about 1000 microns.

3. The cereal-based product of claim 2, wherein the average particle size of the aroma-enhancing component is about 250 to about 1000 microns.

4. The cereal-based product of claim 2, wherein the average particle size of the aroma-enhancing component is about 300 to about 600 microns.

5. The cereal-based product of claim 1, wherein the aroma-enhancing component comprises about 10 to about 70 percent flavorants or aroma components.

6. The cereal-based product of claim 5, wherein aroma-enhancing component comprises about 30 to about 40 percent flavorants or aroma components.

7. The cereal-based product of claim 1, wherein the said crust-enhancement component comprises about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent.

8. The cereal-based product of claim 2, wherein the crust-enhancement component comprises about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent.

9. The cereal-based product of claim 7, wherein the crust-enhancement component comprises about 25 to about 35 percent potato flakes, about 20 to about 25 percent hydrophobic starch, about 25 to about 35 percent crust flavorants, about 10 to about 20 percent colorants, and about 0.2 to about 1 percent anti-caking agent.

10. The cereal-based product of claim 8, wherein the crust-enhancement component comprises about 25 to about 35 percent potato flakes, about 20 to about 25 percent hydrophobic starch, about 25 to about 35 percent crust flavorants, about 10 to about 20 percent colorants, and about 0.2 to about 1 percent anti-caking agent.

11. The cereal-based product of claim 1, wherein the cereal-based product comprises about 0.1 to about 0.5 percent of the aroma-enhancement component and about 0.5 to about 2.5 percent of the crust-enhancement component.

12. The cereal-based product of claim 11, wherein the cereal-based product comprises about 0.15 to about 0.25 percent of the aroma-enhancement component and about 1.0 to about 2.0 percent of the crust-enhancement component.

13. A method for preparing a cereal-based product which can be cooked under low temperature and high moisture conditions to provide a cooked product having the aroma and appearance of freshly-baked goods, said method comprising (1) providing a cereal-based dough;

(2) blending an aroma-enhancement component throughout the cereal-based dough;

(3) shaping the cereal-based dough containing the aroma-enhancement component into a desired shape; and (4) applying a crust-enhancement component to at least a portion of the exterior surface of the shaped cereal-based dough to provide the cereal-based product;

wherein the aroma-enhancement component is an essentially dry powder containing flavorants or aroma components microencapsulated in a hard fat having a melting point of about 100 to about 180° F.; wherein the crust-enhancement component comprises about 5 to about 50 percent potato flakes, about 10 to about 40 percent hydrophobic starch, about 5 to about 50 percent crust flavorants, about 10 to about 40 percent colorants, and about 0.2 to about 2 percent anti-caking agent, and wherein the cereal-based product, when cooked under low temperature and high moisture conditions, provides the cooked product having the aroma and appearance of freshly-baked goods.

14. The method of claim 13, wherein the aroma-enhancement component has an average particle size of less than about 1000 microns.

15. The method of claim 14, wherein the aroma-enhancement component has an average particle size of about 250 to about 1000 microns.

16. The method of claim 15, wherein the aroma-enhancement component has an average particle size of about 300 to about 600 microns.

17. The method of claim 13, wherein the aroma-enhancing component comprises about 10 to about 70 percent flavorants or aroma components.

18. The method of claim 17, wherein aroma-enhancing component comprises about 30 to about 40 percent flavorants or aroma components.

19. The method of claim 13, wherein the said crust-enhancement component comprises about 25 to about 35 percent potato flakes, about 20 to about 25 percent hydrophobic starch, about 25 to about 35 percent crust flavorants, about 10 to about 20 percent colorants, and about 0.2 to about 1 percent anti-caking agent.

20. The method of claim 15, wherein the crust-enhancement component comprises about 25 to about 35 percent potato flakes, about 20 to about 25 percent hydrophobic starch, about 25 to about 35 percent crust flavorants, about 10 to about 20 percent colorants, and about 0.2 to about 1 percent anti-caking agent.

21. The method of claim 13, wherein the cereal-based product comprises about 0.1 to about 0.5 percent of the aroma-enhancement component and about 0.5 to about 2.5 percent of the crust-enhancement component.

22. The method of claim 21, wherein the cereal-based product comprises about 0.15 to about 0.25 percent of the aroma-enhancement component and about 1.0 to about 2.0 percent of the crust-enhancement component.

* * * * *